Figure 1:
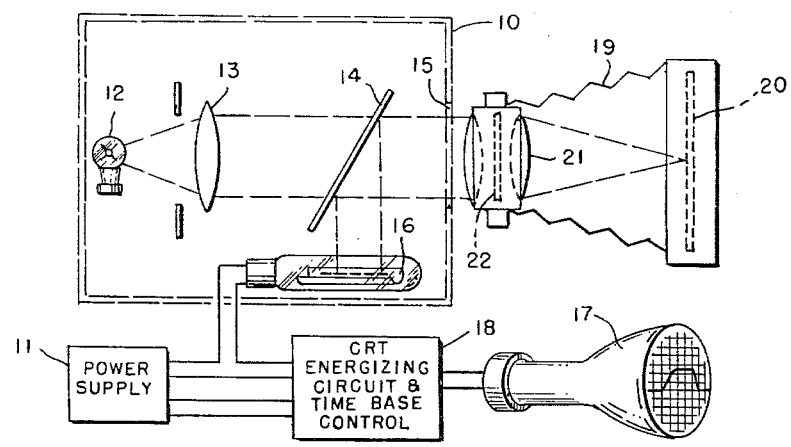

Jan. 18, 1966      LE ROY D. GOLDFARB      3,229,497

SHUTTER TESTING APPARATUS

Filed Jan. 11, 1963

*INVENTOR,*
LEROY D. GOLDFARB
BY
*Harry M. Saragovitz*

ATTORNEY

United States Patent Office 3,229,497
Patented Jan. 18, 1966

3,229,497
SHUTTER TESTING APPARATUS
Le Roy D. Goldfarb, Freehold, N.J., assignor to the United States of America as represented by the Secretary of the Army
Filed Jan. 11, 1963, Ser. No. 250,966
1 Claim. (Cl. 73—5)
(Granted under Title 35, U.S. Code (1952), sec. 266)

The invention described herein may be manufactured and used by or for the Government for governmental purposes, without the payment of any royalty thereon.

In prior shutter testing devices it has been necessary to remove the shutter from the camera or device some means for providing an unobstructed traverse of light through the lens and camera body. In many camera structures this is difficult or impossible to accomplish by the average camera user. Yet it is most important that the user know the timing of his shutter. The other characteristics of the camera are under the accurate control of the manufacturer and do not change with time. For instance, the transmittance of the lens and the calibration of the lens diaphragm do not change. The shutter, however, does change and requires checking at regular intervals.

The present invention provides an accurate and compact device which is operative without disturbing any portion of the camera. The checking operation is performed by aligning a single light injecting aperture on the device with the camera lens and then operating the shutter at its indicated shutter speeds. The resulting measurement may then be read upon the face of a cathode ray tube or other sensing device.

Briefly, the device consists of a light source having a beam collimating means. The beam is directed through a half silvered mirror or the like and thence to a light coupling aperture in a casing inclosing the components of the device. The mirror is positioned at 45° to the beam axis so that light returning from a reflecting surface at the focal plane of the camera will be diverted at right angles to the main beam to a time measuring device which will measure the time interval of the shutter opening.

Depending upon the type of shutter the timing means may be a cathode ray tube or similar device for testing between the lens shutters or a specially deviced electronic means, to be described hereinafter, for checking the velocity of the curtain in a focal plane shutter.

A primary object of the invention is to provide a camera shutter testing device of high accuracy and convenience in operation.

A further object of the invention is to provide a shutter tester having universal application to all types of cameras.

A still further object of the invention is to provide a shutter testing means having a rigid unitary optical structure capable of withstanding rough handling without altering its accuracy.

A further object of the invention is to provide a testing system for checking a shutter mounted on a camera wherein a light beam projected from the system enters the camera through its lens and shutter and is returned by reflection through the shutter and lens, the duration of the reflected beam being measured by the timing cycle of the shutter.

Other objects and features of the invention will more fully appear from the following detail description and will be particularly pointed out in the claim.

Figure 2:
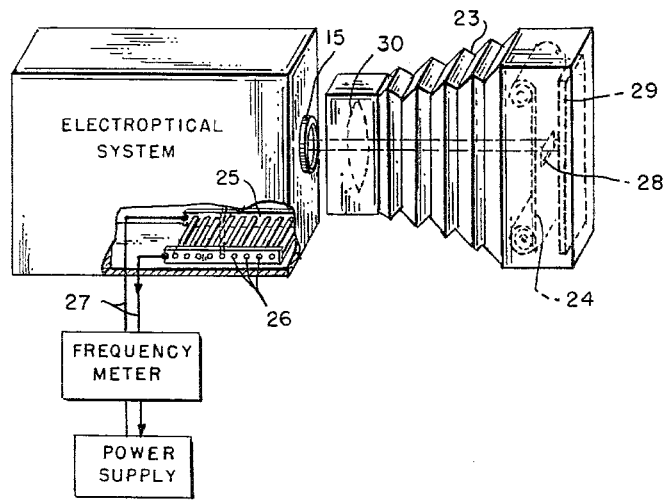

To provide a better understanding of the invention, specific embodiments thereof will be described and illustrated in the accompanying drawings wherein:

FIG. 1 is a partially diagrammatic view of a shutter testing system embodying the invention, and FIG. 2 illustrates a system similar to that shown in FIG. 1 wherein a specialized type of shutter may be tested.

Referring to the drawings, FIG. 1 illustrates a shutter tester embodying the invention having a self-contained electro-optical arrangement for establishing a controlled light beam operative as a timing system whose output is coupled to a readout device. The components of the electro-optical unit is desirably housed in a casing 10 which is completely portable and may be powered by a power pack 11 or any suitable means. A constant light source 12 desirably energized by direct current projects a beam upon a condensing lens 13 which collimates the beam and directs it through a beam splitting device 14 and out through a light aperture 15 in the casing 10. The beam splitter 14 may be of any suitable construction such as a partially silvered mirror having the desired transmittance ratio to achieve optimum operating accuracy. The mirror is desirably fixed at 45° to the beam axis.

Below the mirror 14 out of the path of the main beam and in position to receive light reflected from its silvered surface is placed a converting device such as a photocell 16 which converts the light component to a voltage output which in turn is applied to the grid of a cathode ray tube 17. The tube 17 is powered by conventional circuitry 18 which includes an adjustable time base generator.

The operation of the device is rapid and devoid of critical alignment and close adjustment proecdures. The camera 19 to be tested is provided with a reflecting surface 20 within its inclosing envelope. This may be accomplished by placing a sheet of any suitable material, having a reflecting surface, at the focal plane of the camera or at any position where light entering the lens 21 will be reflected in the opposite direction out through the lens.

The camera 19 is equipped with a so-called between-the-lens type shutter 22. The technique for testing a focal plane shutter is somewhat different and will be described hereinafter. The shutter shown has its leaf type light controlling means placed between the lens elements. In some cameras of this general type the controlling elements may be placed a short distance in front or behind the lens assembly. The invention is equally well adapted to all such cameras.

To make the test the electro-optical unit and the readout device are energized and the camera is placed in position with its lens at the light aperture 15. The shutter 22 is set for a desired operating speed and actuated in the usual manner. Light entering the lens from the source 12 during the time the shutter is open strikes the reflecting surface 20 and is reflected back through the lens, re-enters the aperture 15 and strikes the beam splitter 14 where it is reflected downward to the photocell 16. The resulting output of the photocell will be a voltage pulse having a duration equal to the time the shutter remains open. In addition the opening and closing characteristics of the shutter will be displayed by the amplitude modulation of the cathode ray tube trace. Shutter efficiency may also be calculated by utilizing the displayed information.

To determine the timing of the shutter it is only necessary to measure the duration of the pulse in seconds. One method for measuring the pulse is to adjust the time base of the cathode ray tube to some convenient time cycle which is at least somewhat greater than the estimated timing of the shutter. When the pulse is fed to the vertical deflection plates of the tube (assuming the time base signal is applied to the horizontal plates), a true representation of the timing of the shutter is displayed on the tube face. The actual timing of the shutter is obtained by comparing the waveform on the tube face with the time base scale. By using a C.R.T. having a storage type phosphor the timing can be read directly from the tube. If a permanent record is wanted the display may be photographed in the conventional manner.

In the continuing use of a focal plane shutter the one factor which changes is the accuracy of the curtain velocity. The other factors which determine the quantity of light flux reaching the film are the setting of the lens diaphragm and the width of the curtain slot. The two latter factors may be kept constant and are fixed by the camera manufacturer. If the velocity is known to be correct as indicated by calibration marks thereon the exposure on the film is correctly determined by the other two factors. In the present invention this type of shutter may be tested by substituting a different converting device for the photocell 16.

Referring to FIG. 2 of the drawings a camera 23 having a focal plane shutter 24 is shown in position with its lens at the aperture 15 of the same electro-optical unit shown in FIG. 1. However a different converter unit 25 is substituted for the photocell 16. The converter 25 is composed of a large number of narrow elongated photoelectric elements 26 placed close together to form a grid and interconnected at their ends by common leads which are in turn connected to output leads 27.

In preparation for the test in this embodiment of the invention the slot 28 in the shutter curtain should desirably be adjusted to its smallest opening which will insure maximum accuracy in the results. A light reflecting sheet 29 is inserted at the focal plane of the camera as in the test for a between-the-lens shutter. To obtain the best results the camera 23 and its lens 30 should be positioned to sharply focus an image of the curtain slot 28 upon the grid converter 25 during the test.

To perform the test the lens 30 is held open and the shutter is actuated at an indicated time setting with the electro-optical unit energized. Thus during the curtain travel light from the source 12 will traverse the camera and illuminate the reflecting sheet 29. Light reflected from the sheet 29 will create a moving image of the curtain slot which will be projected upon the grid elements 26 by reflection from the beam splitter 14 causing them to be successively activated and thereby produce a succession of voltage pulses in the output circuit 27 the frequency of which is proportioned to the velocity of the curtain. The pulses may be resolved by any suitable readout means. For example the leads 27 may be connected to a frequency meter to provide a direct visual indication of frequency.

The velocity of the curtain may be computed from the indicated frequency, the number of photoelectric cells 26 per unit length of the grid structure, and the focal length of the camera lens. This velocity may then be compared with the velocity the curtain should have for the given indicated exposure as determined by the camera manufacturer. Correction may then be made for any discrepancy by adjustment of or replacement of parts of the shutter.

A different readout method may be implemented by connecting the output leads 27 to a cathode ray tube in which the time base generator is adjusted for a period at least as long as the time of travel of the shutter curtain. In this manner the pulse train representing the curtain travel is made visible and may be photographed to provide a record which may be analyzed to determine curtain speed at all points in its travel.

I claim:

In combination with a camera having a focal plane shutter to be tested, a shutter testing system comprising a light reflecting surface behind said shutter, an electro-optical assembly outside said camera consisting of a constant light source, collimating means for projecting a beam therefrom, a plannar beam splitter in said beam disposed at approximately 45° from the axis thereof, means for converting light to electrical potential placed outside said beam in position to receive light reflected from said beam splitter, the optical axis of said camera being aligned with said beam, said converter consisting of a plurality of narrow elongated photoelectric elements placed parallel and close together to form a grid structure so aligned with the slot in the focal plane shutter that light from the beam entering the camera will form an image of the slot as it is reflected from said reflecting surface and will scan across said grid structure when the shutter is actuated and readout means connected to the elements of said converter whereby the pulse frequency generated at the grid will be presented to the readout means and is proportional to the shutter curtain velocity.

References Cited by the Examiner
UNITED STATES PATENTS
2,314,254    3/1946    Temple _____ 88—14

OTHER REFERENCES

Data file 112, Time Interval Measurements and How to Make Them. A publication of Beckman Instruments, Inc., Gergeley Division, 2200 Wright Ave., Richmond, Calif. pages 7 to 9 relied upon.

Orlando: Shutter Speed Indicator, Photographic Engineering, vol. 1, No. 1, January 1950, pp. 27–36.

LOUIS R. PRINCE, *Primary Examiner.*

S. C. SWISHER, *Assistant Examiner.*